April 21, 1970  W. D. CREW  3,507,726
ROTARY MICROFILM MOUNTING MACHINE AND METHOD
Filed Sept. 27, 1966  3 Sheets-Sheet 1
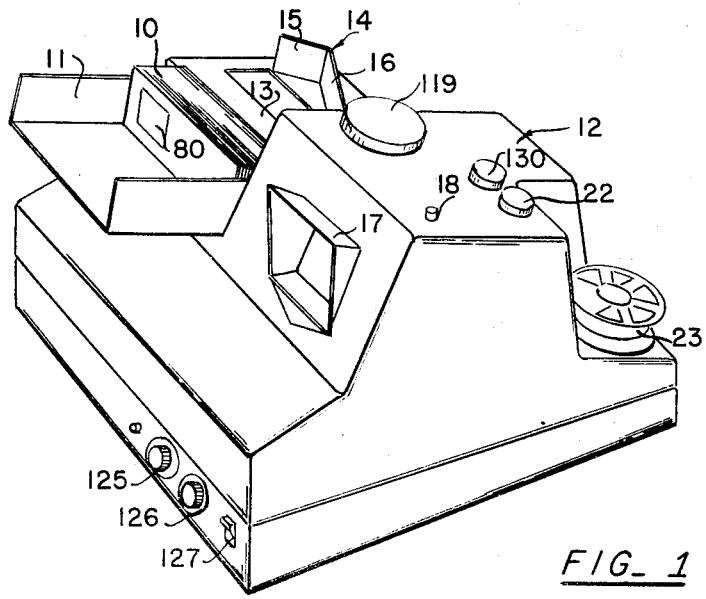
FIG_1
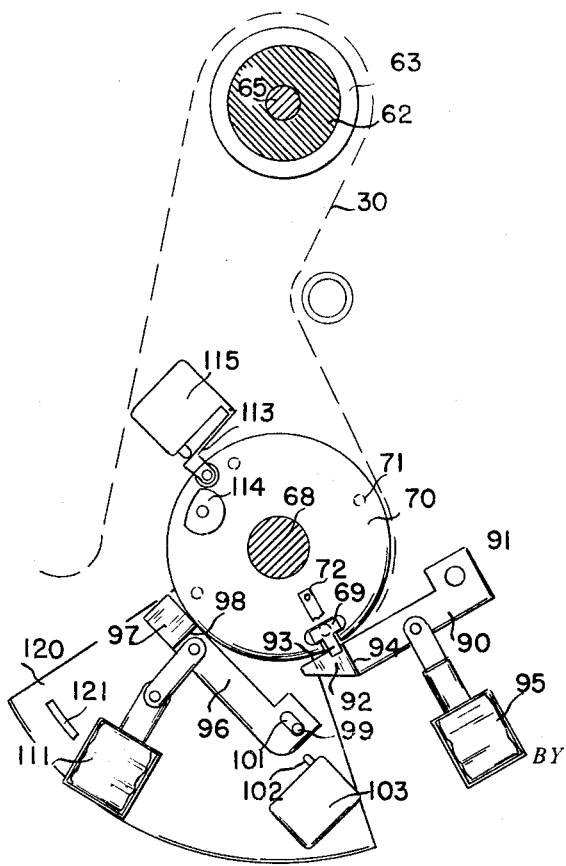
FIG_5
INVENTOR.
WYNN D. CREW
BY
ATTORNEY

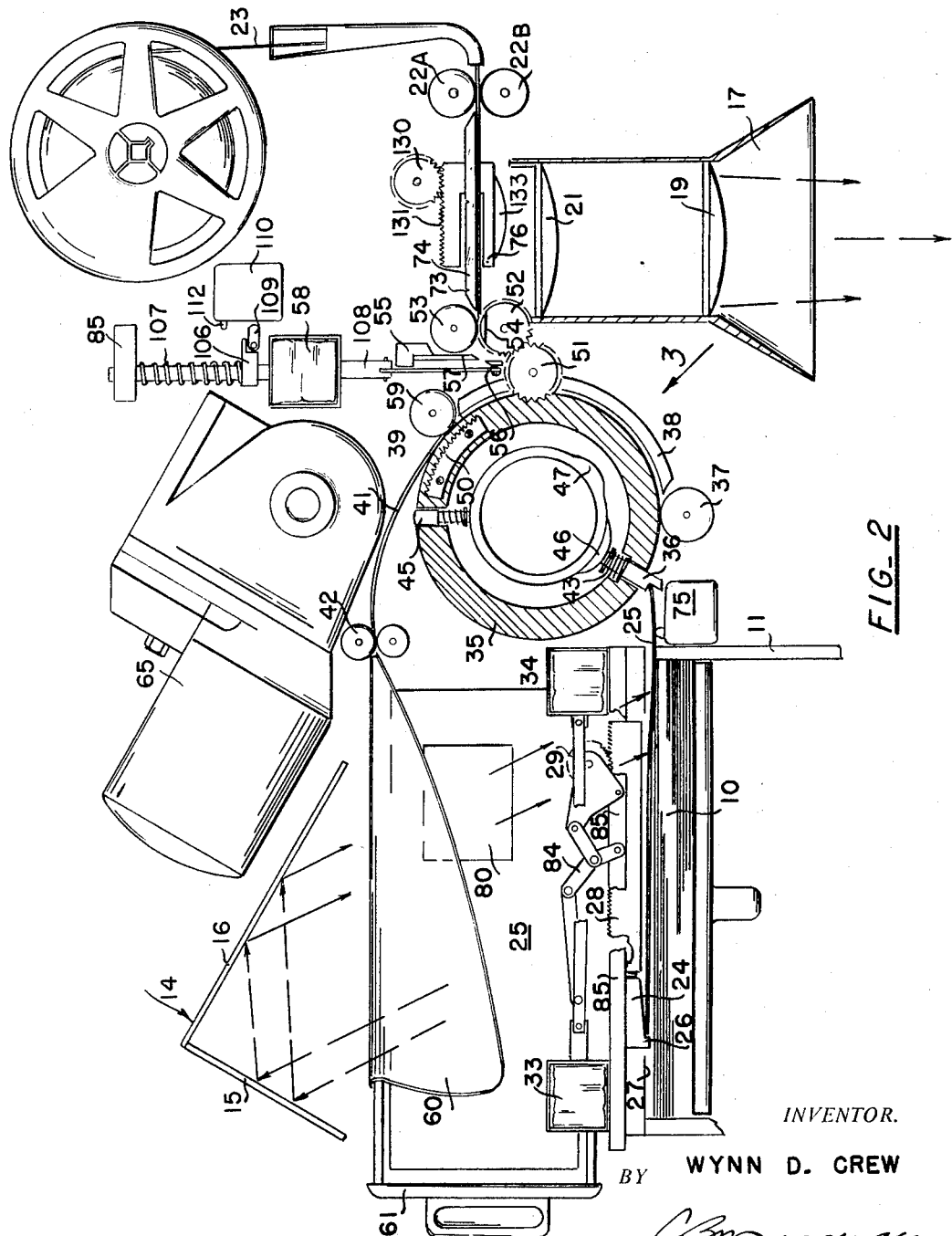

April 21, 1970     W. D. CREW     3,507,726

ROTARY MICROFILM MOUNTING MACHINE AND METHOD

Filed Sept. 27, 1966     3 Sheets-Sheet 3

INVENTOR.
WYNN D. CREW
BY
ATTORNEY

United States Patent Office 3,507,726
Patented Apr. 21, 1970

3,507,726
ROTARY MICROFILM MOUNTING
MACHINE AND METHOD
Wynn D. Crew, 9655 W. Colfax Ave.,
Lakewood, Colo. 80215
Filed Sept. 27, 1966, Ser. No. 582,283
Int. Cl. B65h 27/00; B32b 31/04, 31/16
U.S. Cl. 156—108                          20 Claims

ABSTRACT OF THE DISCLOSURE

A method and mechanisms for removing the glassine cover sheet from aperture cards and for cutting and mounting strips of film from a supply roll of film wherein the card is bent to stress the cover sheet adhesive bond as an element moves to contact the cover sheet to initiate removal and wherein said cards and film move along converging paths and into contact before the film is cut.

Figure 3:
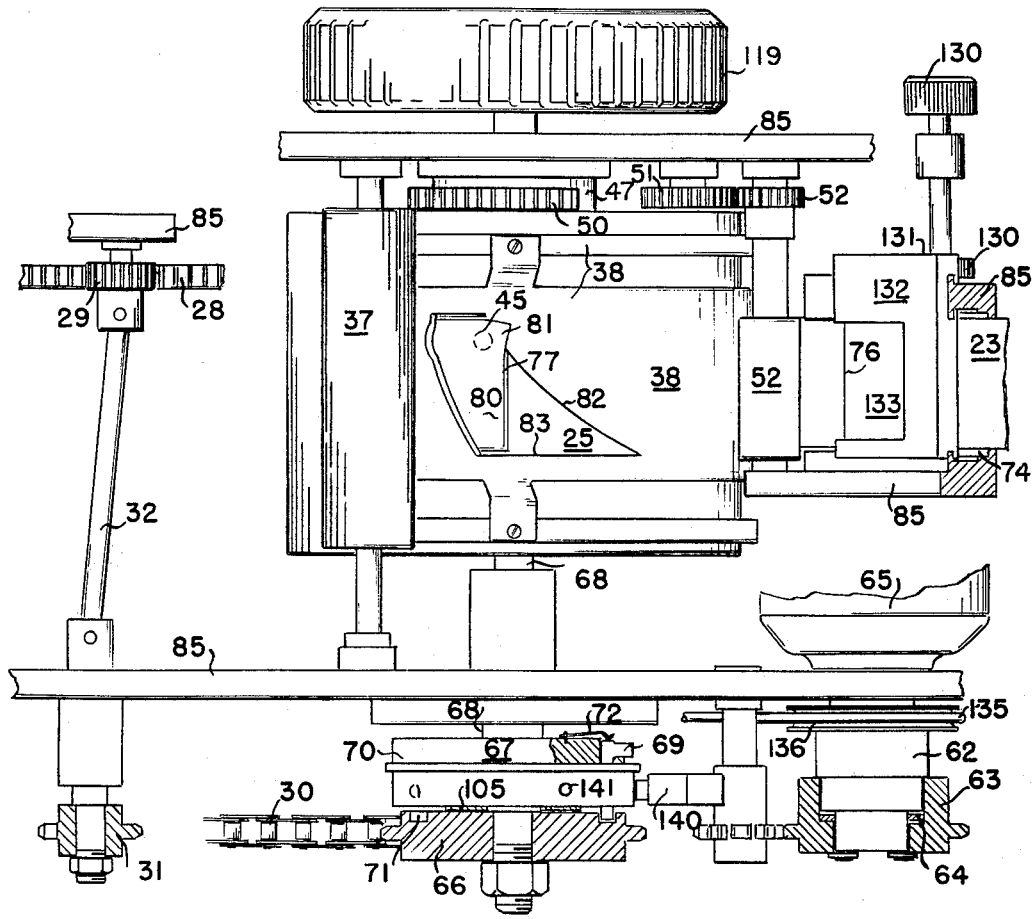

A rotary drum moves and bends the cards and serves to carry and/or actuate a cover sheet plunger and a film cutoff element. Film and card viewing devices facilitate selection and registration operations.

---

The present invention relates to a machine for automatically placing individual frames of film from a continuous strip supply reel into aperture cards. The mechanism provides for initial cross-matching of the index materials printed on the aperture card and the materials observed on the frame of film that is to be emplaced. More particularly, the invention relates to a rotary automatic mounter which moves individual aperture cards along a curved path to first remove a glassine cover sheet to expose an adhesive edge strip disposed about the aperture and which simultaneously cuts a single frame of film from a supply strip and applies the sized frame of film to said exposed adhesive.

In addition to the accurate placement of the cut film on the aperture card, the mechanism returns processed cards to an output tray in a serial order and orientation corresponding to the original order of card introduction. The mechanism is constructed to move the aperture cards along a curved path that is intersected by the film emplacing apparatus. This configuration has been adopted in order to provide an overall mechanism that can be conveniently operated at higher speeds than some existing film mounters and further to eliminate some of the difficulties of previous film mounting mechanisms in which the cards were moved reciprocally to and from operative stations or in which it was necessary to stop the aperture cards at the time of film emplacement in order to assure proper alignment.

Mechanisms made in accordance with the present invention are intended to satisfy further objectives in addition to those inherent in the provision of a rotary apparatus as opposed to stop linkage or reciprocating type mechanisms. One such further objective of the invention is to provide a mechanism and construction which facilitates a faster overall operation so that an operator is able to match and place a greater number of film segments in a set work period.

Another object of the invention is to provide means for moving the aperture cards along a curved pathway in order to facilitate the removal of the glassine cover sheets.

A further objective served by the curved flow path for the aperture cards is to maintain processed cards in the same sequence, order and orientation as the unprocessed cards.

An overall objective is to avoid the high wear and high maintenance or alignment requirements of other than rotary mechanisms.

A further object of the invention is to provide cooperative mechanisms for delivering aperture cards on which the aperture surrounding adhesive edge strip has been exposed to a work station simultaneously with the leading edge of a precut film segment so that the film may be emplaced on the adhesive in desired position to be roll pressed into secure engagement on the card.

Another object of the invention is to provide means for viewing the film strip and for adjusting the position of the film strip in order to assure a proper cutoff and placement of each film strip.

Further objects of the invention are to provide cam and solenoid operated mechanisms for initiating or accomplishing certain step processes at a time interval regulated with respect to the card drum rotation.

Another object is to provide a combined film viewing and card viewing combination so that a preindexed card may be properly matched with a desired frame of film.

In connection with such viewing mechanism, it is an object of the invention to provide a reversing mirror system so that the image of a card disposed inwardly away from the operator can be seen in reversed or direct reading orientation for easier matching of the card and microfilm section.

An overall objective of the invention is to provide a mechanism which will receive and hold a plurality of aperture cards in stacked relationship for separate delivery through the mechanism simultaneously with the feed and application of segment pieces of film that is dispensed from a continuous strip film supply disposed on a reel carrier.

Figure 4:
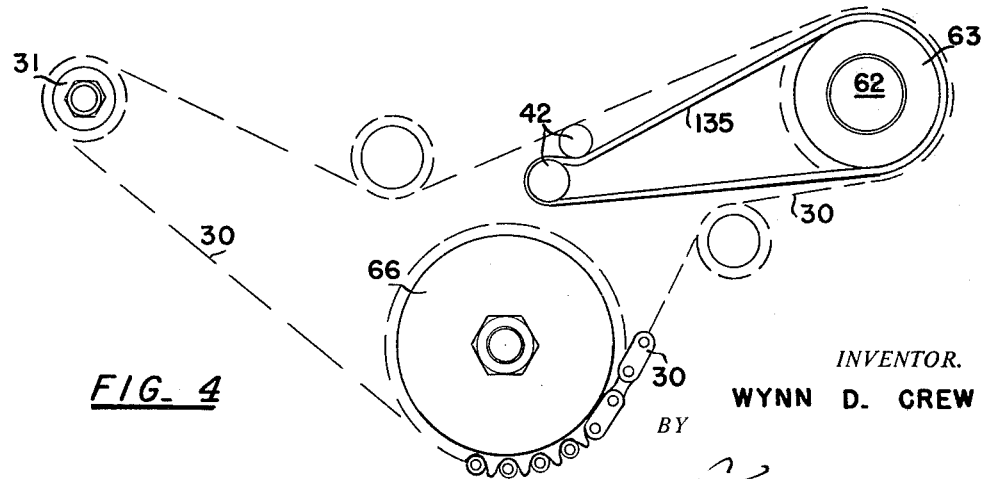

Further objects and advantages of the present invention will be apparent from the appended description and drawings, in which FIG. 1 is a perspective illustration showing the outer case and general configuration of an embodiment of the invention, FIG. 2 is a top plan view in partial section illustrating the positional arrangement of components of the invention, FIG. 3 is a side elevation in partial section taken in the direction shown by the arrow 3 in FIG. 2 illustrating further components of the invention, FIG. 4 is an illustration showing the drive arrangement for components of the invention, and FIG. 5 is a top plan partial view taken along the line 5—5 of FIG. 3 showing further details of a clutch and drive mechanism.

Briefly stated, the present invention provides a microfilm viewing and mounting apparatus incorporating construction features which make it possible to view index materials on a previously prepared aperture card and at the same time to observe the characteristics of a film segment or index markings thereon to maintain correlation between the film and the card to which the film will be attached. After observation of the card and the film, the operator can initiate the automatic mounting of the film in the aperture card by depressing an initiate or start button. In correlated sequence the machine will pick up a single card and deliver it to a rotating drum to be held against the drum by guide elements. As the card moves with the rotating drum a sheet of glassine paper protecting an adhesive edge strip on the aperture card will be removed. The leading edge of the film to be emplaced will be trimmed to a proper length and proper position as determined by a previous correcting alignment of the film, and the film will be fed toward the rotary drum in time regulated sequence so that the leading edge of the film will contact a first edge of the now exposed adhesive. Subsequently, a gauge length or frame of film will be cut from the film supply roll, and with further movement of the card and film, the film will be rolled into engagement with the adhesive strip. The card with mounted film frame will then be directed to a discharge guide chute to be inverted and re-established in a pile of film carrying cards in the original serial order and orientation.

The desired and described step processes are accomplished by cam elements operating with the rotary drum and by electrical controls and switches operated in desired sequence in accordance with the instantaneous position of the rotary drum in any particular cyclic operation of the mechanism.

In addition to the electrical controls for initiating a film emplacement cycle and for completing such individual cycle, the mechanism further includes additional electrical and electronic means for controlling repeat operations of said mounter components. Accordingly, the machine can be programmed to mount a single frame of film on a single aperture card, or once an initial desired alignment between a specific frame of film and a specific card has been established, any number of film frame segments can be automatically mounted on successive aperture cards as determined by a number setting on index dial controls of the mechanism. With this arrangement, if three or any other set number of identical copies are to be mounted, this set number of copies can be run automatically once the initiate button has been pressed. Since it is often desirable to have several identical cards so that multiple sets of drawings or of particular data can be provided to different recipients, it has been found very convenient to provide this automatic repeat operation of the mechanism.

Other improved features of the invention include the card reader and film viewer combination, the novel form of the glassine removal components and the interrupted drive components which make it possible to feed only the desired length of film for each repeat cycle of the card drum.

Further advantages of a specific embodiment of the present invention will be more readily apparent after a description of the drawings and illustrations provided. While FIG. 1 presents the overall exterior configuration for the mechanism, it is believed that FIG. 2 better illustrates the working components of the invention. For clarity of understanding and for better correlation of this description to an actual embodiment of the invention, however, it is believed that the reader's attention should be periodically directed to the FIG. 1 illustration. In both of these figures it is shown that a supply of aperture cards 10 is maintained in the supply tray 11 of the rotary automatic mounter 12. Preferably the cards are placed in this tray with the printed face disposed inwardly so that any indexing information provided adjacent the top of the card will stand above and be exposed past the top of the tray 11 and past the top of the mounter cover 13. With this arrangement an image of such index information can be seen in the mirror system 14. Further, it should be noted that since mirrors 15 and 16 are disposed at right angles each to each the image observed by an operator of the automatic mounter 12 will not be backwards even though the indexing information on the exposed face of the card is reversed with respect to the viewer's position. The perpendicularly disposed mirrors tend to reverse the image so that it can be directly read by the viewer.

In operation of the device, the viewer will ordinarily have an eye disposed in position aligned with the film viewer 17 and the lenses therein. When the operator is in this position, the initiate button 18 will be conveniently disposed and the angle mirror system 14 will be properly positioned and oriented to provide the desired reversed image of materials on the innermost or exposed aperture card in the tray 11. In addition to checking the pre-prepared information on the aperture cards, the operator will be able to observe the nature of the next segment of film or indexing information identifying such next segment of film by directly viewing such film segment through the lenses 19 and 21 of the viewer 17.

After the film segment has been identified either by subject matter or by index as the proper segment to be mounted on the aperture card in the exposed position on the tray 11, the operator could, by pressing the initiate button, mount the film segment in the observed aperture card. Before initiating such emplacement operation of the mechanism, however, it may be desirable for the operator to more accurately align the film strip that is to be mounted. By rotating the knob 22 on top of the mounter 12, a roller 22A disposed within the case 12 will be rotated; accordingly, the film strip 23 which is passed between rollers 22A and 22B can be moved to the left or right until it is properly centered in the operator's view. Gauging elements such as the scribed lines 73 on transparent film support 74 may also be observed through the viewer 17 to facilitate alignment. A movable guide line 76 may also be provided to assure proper positioning of the frames of film that are to be severed from the film strip 23 for placement in the aperture cards.

As a first overall view of the operations that follow actuation of the initiate button 18, the following functional steps will be accomplished. A feed head 24 having a card engaging lip 26 will be caused to move from left to right to pick up the innermost aperture card 25. At the same time drum element 35 will rotate from its stopped position to a point where a cam actuated card stop 36 is extended beyond the drum surface. Since the card feed head 24 moves slightly ahead of the card stop 36, the card will be slightly bowed by its forced engagement with the card stop 36. Actually a microswitch 75 is positioned to sense the presence of the aperture card 25 as it is pushed outwardly toward the card stop 36. Upon actuation of the microswitch 75 by the aperture card 25, rotation of the drum 35 is initiated, and the card 25 will then follow behind the card stop 36 until it is introduced under the first guide roller 37. Guide roller 37 operates in contacting or near contacting relationship with the drum 35. Further rotation of the drum 35 will bring the card into contact with a guide 38, and this guide will hold the card on a curved path about the exterior surface of the drum until the guide is terminated adjacent pressure roller 59. Thereafter, the card moves away from the drum to be guided by a bent element 41 toward final expelling rollers 42.

Since the card stop 36 rotates with the drum, the stop must be retracted as it passes under the entrance roller 37. The form and position of the card stop cam 46, which is stationary within the drum, permits this desirable retraction as powered by the spring 43 on card stop 36. As the card drum 35 rotates further past the card stop cam 46, the card 25 will move with the drum, since its movement is powered initially by the feed head 24 and, subsequently, by rotation of the entrance roller 37. Entrance roller 37 is geared to the drum and is regulated to have a surface speed identical with that of the card drum 35.

When the drum has rotated to a position so that glassine punch 45 is moved around to a position engaging the punch cam surface 47, the card 25 will have moved a corresponding length about the drum 35 and guide 38. The glassine punch 45 and the leading edge 77 of the aperture 80 in the card 25 are in aligned position as the punch 45 rides up on the punch cam surface 47. The punch will be extended outwardly past the barrel surface of the card drum 35, and the top edge of the glassine will be poked outwardly away from the drum. This particular step in the cyclic operation of the mechanism is shown in FIG. 3. As the glassine 81 is forced outwardly, the leading free edge 77 will be moved through guide opening 83 and behind the limits of the guide surface 38. Further rotation of the card drum and card will effect a removal of the glassine 81 as it engages the sloped edge 82 of the guide opening 83. When the glassine is removed, the edge of the adhesive 49 which is disposed about the edge of the aperture 80 will be exposed to receive a cut segment of film.

Shortly after the punch 45 has been extended by reason of its contact with the cam 47, the segment gear 50 will come into mating contact with the teeth of film drive gear 51. This contact initiates rotation of the film feed roller 52 and its follower 53. Before initiation of such rotation, however, it should be noted that the film may be moved reciprocally between the rollers, since roller 52 has a flat side 54 in position aligned with the vertical position of the film 23. With this flat side disposed toward the film, the film will not be engaged by the roller 52, and its position can, accordingly, be adjusted by rotation of the knob 22 and its associated rollers 22A and 22B. As soon as the gears 50 and 51 are engaged the rollers 52 and 53 will be rotated away from the nonengaging position and further rotation will cause the film strip 23 to be moved through the scissors elements 56 and 57 of the cutoff mechanism 55. Before such automatic feed of the film is started by rotation of roller 52, the leading edge of the film will have been trimmed by a first actuation of the cutoff solenoid 58. Accordingly, when the film is fed inwardly against the card drum and beneath the pressure roller 59, the leading edge of the film will engage a leading edge of the adhesive 49 within the aperture 80.

After a single frame length of film has passed the feed rollers 52 and 53, the drum 35 and the film feed will be momentarily stopped; the cutoff solenoid 58 will again be actuated to cut the film and to sever a single film segment from the supply strip of film 23. As movement is again started, the film segment will be pressed into secure engagement with the exposed adhesive edge 49 by the pressure roller 59 as the card is again moved along its curved path. Subsequently, the card will be guided out and away from the card drum 35 by the guide surface 41, and since the card will then be engaged by the expell rollers 42, the top surface of the card will be propelled into contact with the transparent inverter element 60. Movement of the top edge of the cards against the element 60 while the bottom edge is held in a rail extending above and outwardly along the output tray 61 causes the card to be inverted before it falls into the output tray 61. With this inversion of the cards, the cards upon which the film segments have been mounted will be in the same serial order and same orientation in the output tray 61 as those initially stacked in the supply tray 11.

At each step in this cyclic operation of the mechanism, there are additional operative elements which assure the proper alignment and time sequence correlation of the various mechanisms. The prime time regulating function is, of course, served by the rotating card drum 35 itself, since most of the other card or film drive members are geared or otherwise powered or actuated by the rotation of the card drum and its associated rotating components.

A closer consideration of the manner in which all of the components are caused to work together in a timed sequence to properly accomplish the emplacement of a cut film segment in a single aperture card or the emplacement of multiple cut segments in a corresponding number of aperture cards can probably best be explained after further detailed explanation of some of the further components of a specific embodiment of the invention. Considering first the elements that work with or are associated with the cards, a further explanation of the initial card feed is in order.

As illustrated in FIGS. 2 and 3, the cards are received in the tray 11 and will regularly move down along the upwardly tilted tray. The card engaging lip 26 of the feed head 24 extends through an opening in a bottom wall 27 of the tray 11. The feed head 24 is attached to a gear rack 28 for movement therewith. The rack 28 moves reciprocally to deliver the card toward the drum 35 when the rack is engaged and driven by a pinion 29. Pinion 29 rotates all the time that the motor 65 is on. This rotation is powered by the drive chain 30, a sprocket 31 and universal joint coupled shafts 32. When the feed head 24 is to be moved, the pinion 29 is moved into contact with the rack 28, and the rack is moved reciprocally to the right as shown in FIG. 2. A solenoid controlled mechanism is used to move the pinion into and out of engagement with rack 28. This mechanism includes the solenoids 33 and 34. When the solenoid 34 is energized as illustrated, the solenoid armature will be moved to the right, and the linkage mechanism 84 will hold the pinion 29 in contact with rack 28. Once a full stroke has been made, solenoid 34 will be deactivated, and a microswitch (not shown) will actuate solenoid 33 to disconnect the drive between the rack 28 and pinion 29. The rack 28 and feed head 24 will then be returned to the original at-rest position ready for the next actuation when another card is to be delivered to the rotating drum 35. The return of the rack 28 can be powered by a spring or other mechanism (not shown). In this embodiment of the invention the linkage 84 is anchored to a component of frame 85 so that the pivot supports for the linkage 84 and for the pinion 29 does not move. A similar result can be obtained through use of a slide bar which moves with the solenoid armatures and which further provides a cam slot which will move the pinion 29 into and out of engagement with the rack 28.

The card movement which is initiated by actuation of the solenoid 34 represents a first step in the cyclic process of the mechanism. This first step starts as soon as the initiate button 18 has been pressed. The further operations of the mechanism will not be undertaken until the moving card contacts the button of microswitch 75. Once contact has been closed through the microswitch 75, the card drum 35 may be set into rotation. The mechanism for initiating this rotation is best shown in FIG. 3. Here it will be seen that the motor 65 is provided with a drive collar 62. Rotation of the drive collar is imparted to a drive sprocket 63 by a one-way clutch mechanism 64; accordingly, at all times that the motor is running the drive sprocket 63 and the chain 30 will be caused to move. With movement of the chain 30 the follower sprocket 66 which is associated with the card drum 35 will be rotated. A pin clutch 67 is provided to interconnect the follower sprocket 66 and the drive shaft 68 of the drum 35. The particular type of clutch illustrated uses a pin 69 to interconnect a control flange 70 on shaft 68 and the follower sprocket 66. Multiple holes or recesses 71 are provided in the upper surface of the follower sprocket 66, and these holes 71 are adapted to receive the lower end of the pin 69 as the pin 69 is moved toward engagement in any of such holes by a leaf spring 72. When the pin 69 is engaged, the sprocket 66, flange 70, shaft 68 and the drum 35 will all rotate together with respect to the frame components 85. When the drum is to be stopped, the pin 69 must be moved upwardly and out of engagement with the holes 71 in follower sprocket 66.

Mechanisms disposed for contact with the pin 69 and for disengaging the pin are disposed at two locations about the flange 70. These mechanisms are not shown in FIG. 3, since they would obscure illustration of other components there shown, but are shown in FIG. 5. The stop control link 90, as shown in FIG. 5, provides a main stop for the drum. Stop control link 90 rotates about its pivot 91 to positions away from the flange 70, or alternately close to the flange so that inclined surface 92 may be engaged under the outwardly extending arm 93 of pin 69. As the arm 93 rides up the inclined surface 92, the pin 69 will be withdrawn from its contact in the holes 71. When the pin is fully withdrawn, the rotation of flange 70 will be stopped as the arm 93 comes into contact with the shoulder 94 on link 90. FIG.

5 illustrates this position, which corresponds with the stopped position for the drum 35. When a new film mounting cycle is to be started, the pin 69 must be allowed to engage the next hole 71 in the follower sprocket 66 that can be encountered. Accordingly, as soon as the microswitch 75 has been actuated indicating the movement of a card 25 from the stack 10, a signal is transmitted from the microswitch to the stop control solenoid 95. Upon actuation of this solenoid the link 90 will be retracted, the pin 69 will be moved downwardly by the leaf spring 72, and rotation of the flange 70 and of the drum 35 will follow. The drum will continue its cyclic rotation until the pin 69 comes into engagement with inclined surface 97 on film cut control link 96. Movement of the pin arm 93 over this inclined surface 97 will halt the pin powered rotation of the flange 70. It is desirable, however, that the arm 93 be brought into full contact with the shoulder 98 on film cut control link 96. As shown, the cut control link 96 is adapted for reciprocal movement as guided by the mounting pin 99 in slot 101. If link 96 is moved reciprocally, it can come into contact with button 102 of a second cut enable microswitch 103. When this microswitch 103 is closed, the solenoid 58 and cutoff mechanism 55 will be activated to cut the film and to sever a single film frame from the supply strip of film 23.

The contradictory requirement to stop rotation of the drum and, accordingly, of the film feed 51-52 while a second film cut is being made and the requirement to have reciprocal movement of the cut control link 96 is satisfied through provision of a clutch facing 105 between the follower sprocket 66 and the control flange 70. Accordingly, when rotation of the control flange 70 as powered by interlocking pin 69 is interrupted, the control flange will still be rotated by the clutch facing 105 to bring the pin arm 93 forcibly against the shoulder 98 thereby moving the link 96 into contact with microswitch button 102. As soon as this button is contacted, solenoid 58 will pull the moving scissors element 56 against the stationary scissors blade 57 to cut the film. This cutting movement will be accompanied by reciprocal movement of the armature 108 of solenoid 58. As the armature moves, the spring mount 106 will tend to compress the spring 107, and the pivotally mounted pawl 109 will move freely past button 112 on restart microswitch 110. After the film has been cut, the cutting mechanism will be returned to its original position by the force of spring 107. On the return movement pawl 109 will actuate restart microswitch 110 and current will be delivered to restart solenoid 11, film cut control link 96 will be withdrawn, pin 69 will make contact with another hole or recess 71, and the drum will again be rotated so that the severed film segment will be rolled into secure engagement on the card by the pressure roller 59. This final rotation of the drum will, of course, be continued until arm 93 on pin 69 is lifted away from its drive relationship as the arm again moves up inclined surface 92 of stop control link 90.

A full rotation of the pin 69 and flange 70 from stop position to stop position as illustrated will accomplish the mounting of the film frame in a single card. If multiple frames of film are to be mounted without interruption, it is only necessary to move the stop control link 90 out of position for contact with pin arm 93. This repeat cycling of the mechanism can be easily obtained through provision of a repeat microswitch 115 which will serve to energize the stop control solenoid 95 each time that the pin 69 approaches the control link 90. The follower-roller 113 of microswitch 115 can be positioned to engage a cam button 114 which moves with the flange 70 to repeatedly energize solenoid 95 when the repeat circuits of the mechanism are energized. The signal from the microswitch 115 can be used not only to control energization of the stop control solenoid 95, but this signal can also be used to determine the number of times that the film mounting cycle shall be repeated. In other words, if four copies are to be provided, a step by step or crossbar switch can be set to accept four signals before the circuit through the repeat microswitch 115 is interrupted. With proper design of the cam button 114 and follower-roller 113, a signal quite similar to telephone switching signals can be derived from the repeat microswitch 115. Accordingly, crossbar and step by step switches of conventional manufacture can be used to control the number of copies or the number of film segments that are to be emplaced on separate cards before the pattern is to be interrupted for the identification of new microfilm materials or for periodic realignment of the individual film frames to assure proper placement of the microfilm images in the aperture of the mounting cards.

For all repeat operations of the machanism the microswitch 75 will still be operative so that a card must be picked up by the feed head 24 if the mounting operations are to continue. In use it has also been found that it is desirable to have the cut control link 96 and its associated solenoid 111 and microswitch 103 adjustably movable about the flange 70. If all of these components are rotated to alternate positions, the length of the frame of film that is to be cut can be slightly modified to assure attainment of a proper size for mounting in the apertures of preprepared aperture cards. A segment mount 120 which will facilitate this adjusting movement is shown in FIG. 5. The mount provides elongated circumferential slots 121 to facilitate the adjustment.

Actually two cuts must be made for each frame of film that is processed. A first cut ordinarily removes only a small sliver of film, and the second cut separates the frame that is to be mounted. The mechanism for time spacing the second cut has been described. The operative elements for making a first cut are not quite as complicated, since this cut can be made as soon as the film has been properly aligned with respect to any gauging elements, such as the scribe lines 73. The first cut can also be made in the interval after the initiate button has been pressed and before movement of the film has been started. Since there is movement of the drum 35 before the segment 50 comes into driving contact with the film drive gear 51, this first cut can be accomplished as the drum moves. Accordingly, the first cut can be made after the presence of a mounting card has been indicated by the microswitch 75. In FIG. 3 it is shown that a plurality of dimples 141 can be disposed about the control flange 70. These dimples are used to actuate a microswitch 140 which is directly connected to the cut solenoid 58. The operation of the solenoid 58 can be the same as that previously described, and since the drum is already rotating, the actuation of restart microswitch 110 will not present a problem.

Before the film is cut or presented for mounting it is desirable that the information on the microfilm be checked against any index information on the next mounting card. The film viewer apparatus 17 may be used to make such a coordination check, but it can also be used to obtain proper alignment of the film. The scribe lines 73 on the film support 74 or the movable guideline 76 may be observed to check this alignment. The movable guide line 76 moves with respect to the film and with respect to the film support 74. With this arrangement the guide line 76 may be positioned at the edge of a plate identification box or other distinctive object observed on the microfilm. Close adjustment of the positioning of guide line 76 and of such film identification elements can be obtained by adjustments of a guide line—lens adjusting knob 130 which extends above the machine cover 13. This knob 130 is connected to a gear in mating engagement with a rack 131. Rotation of the knob 130 will cause reciprocal movement of rack 131 and of a lens mounting frame 132. In addition to providing a moving guide line 76, the frame 132 provides support for an auxiliary lens 133. This lens may be moved across the face of the microfilm to further magnify any information on the film as an aid to easier identification of the particular film frame that is next to be mounted.

While most of the rotatable components of the mechanism are driven by the drive chain 30, it has been found desirable to separately drive the expel rollers 42. For this purposes a separate pulley 136 is mounted on the drive collar 62 of motor 65, and a flexible belt 135 is reeved between the pulley 136 and the front expel roller 42. With this arrangement the expel rollers can be rotated at an increased surface speed so that the cards will be rapidly ejected once the mounting operations have been completed. The acceleration of the card as it is ejected helps in the attainment of the inverted placement of the cards as received in output tray 61.

A further feature of the invention is shown in FIG. 2 where arrows have been drawn to show a potential line of sight correlation between the film viewer 17 and the mirror system 14. The arrows indicate the image reversal possible through use of the right angle mirror system 14. If a viewer's eye were disposed approximately 8 inches in front of the film viewer 17 as illustrated, the observer would see in mirror 15 an image of indexing materials on the front aperture card as reflected in the mirror 16. The materials observed would be in correct viewing order, though the actual position of such indexing materials would be reversed when related to the viewer's position. With this arrangement the observer's eye can be kept in position in front of the film viewer 17 so that no head movements are necessary to cross-check the indexing materials on the next aperture card and on the next frame of microfilm.

The one-way clutch 64 previously described provides means for hand manipulation of the drum 35 so that the exact timing of all operative components may be checked or regulated. Without the clutch 64 it would be difficult to rotate the drum backwardly due to the substantial gear reduction in the gear motor 65. With the clutch installed, drum knob 119 may be rotated to move the drum to its various operative positions for alignment and time checks of the components.

I claim:

1. A method for removing a releasably adhered protective cover sheet from normally flat aperture cards having adhesive film mounting edges disposed inwardly of apertures in the cards comprising bending the aperture card as it is moved along a curved path with the cover sheet disposed outwardly with respect to said path of curvature whereby stress in said adhesive bond is increased, directing a supplementary force against said cover sheet in a direction increasing the stress in said adhesive bond to initiate removal thereof, and subsequently guiding said aperture card and cover sheet along divergent paths whereby said cover sheet is fully removed from said aperture card.

2. The method of claim 1 and further incorporating steps emplacing film in said apertures and against the adhesive edges thereby exposed comprising moving a strip of film along a pathway that converges with the movement path of said card after removal of said cover sheet whereby the leading edge of said film strip is brought into engagement with the leading exposed adhesive edge of said aperture card, and subjecting said film and all of said adhesive edges to pressure influences past said point of convergence whereby the film will be mounted in said aperture.

3. The method of claim 2 and further comprising the steps of momentarily halting the movement of said aperture cards and film strip after the leading edges of said strip of film and said adhesive have been engaged, and severing said film strip when the movement is halted for cutting a frame of film from said strip of film for mounting in said aperture when movement is resumed.

4. A mechanism useful in film mounting operations utilizing previously prepared aperture cards having an adhesive edge disposed inwardly of an aperture in the card and a cover sheet releasably adhered to said adhesive edge for the initial protection of said adhesive comprising a rotary member for engaging and moving an aperture card along a curved path whereby said card is bent, and a force exerting element operative in direction transverse to said curved path and through the aperture of said aperture card for operation against said cover sheet for initially moving said cover sheet away from its adhesive engagement with said card.

5. Structure as set forth in claim 4 and further inclusive of guide means for divergently moving said cover sheet and card to complete the removal of said cover sheet as the aperture card moves past said guide means.

6. Apparatus as set forth in claim 4 wherein said rotary member receives and moves the aperture card along the curved path with the cover sheet disposed outwardly with respect to said path of curvature whereby an increased stress is exerted against said adhesive bond.

7. Structure as set forth in claim 4 wherein said force exerting element moves with said rotary member, and further inclusive of a cam element regulating the operation thereof.

8. A mechanism useful in film mounting operations utilizing previously prepared aperture cards having an adhesive edge disposed inwardly of an aperture in the card and a cover sheet releasably adhered to said adhesive edge for the initial protection of said adhesive comprising a curved guide member, means for moving an aperture card along the curved path defined by said guide member to bend said aperture card with the cover sheet disposed outwardly with respect to said path of curvature whereby stress is increased in said adhesive bond, and means acting on said cover sheet and in direction supplementary to said increased stress whereby the bond between the cover sheet and adhesive is ruptured to initiate removal of said cover sheet.

9. The mechanism of claim 8 together with film emplacing elements comprising a supply of film, and means for moving said film along a path converging with the curved path of movement for said aperture cards after removal of the cover sheet.

10. Structure as set forth in claim 9 and further comprising a supply tray for receiving aperture cards in stacked relationship, a feed mechanism for separately feeding individual cards from said stack to said aperture card moving means, and a mechanism for sensing the introduction of an individual card for movement toward said curved path before the film moving means is actuated.

11. Structure as set forth in claim 9 and further comprising means for regulating the time sequence for movement of said film and aperture card whereby the leading edges of said film and aperture will be brought into mating engagement.

12. Structure as set forth in claim 9 and further comprising pressure exerting means disposed at the point of convergence for said film and aperture cards whereby the film will be pressed against the exposed adhesive to securely mount the film on said aperture card carrier.

13. Structure as set forth in claim 4 and further comprising cutoff elements actuated by said rotary member for cutting a frame of film from said film supply for placement in said aperture.

14. Structure as set forth in claim 11 and further comprising a film viewer disposed transversely to the movement path for said film and in circuit arrangement ahead of and out of alignment with the first point of mating engagement for said film and aperture card.

15. Structure as set forth in claim 14 and further comprising a supply tray for receiving aperture cards in stacked relationship with an index portion of the next aperture card that is to be mounted being exposed for viewing by the machine operator.

16. Structure as set forth in claim 15 and further comprising a mirror system positioned in a normal line of sight for a machine operator to facilitate identification of said bottom aperture cards.

17. Structure as set forth in claim 9 and further comprising a cutoff element for cutting said film disposed transversely to the movement path for said film and in circuit arrangement ahead of the first point of mating engagement for said film and aperture card, and means for interrupting movement of said film for actuation of said cutoff element.

18. Structure as set forth in claim 11 wherein rotary means is provided for moving the aperture card along the curved path and further comprising cutoff elements actuated by said rotary member for cutting a frame of film from said film supply for placement in said aperture.

19. The mechanism of claim 18 and further comprising an electromechanical control system for regulating the time sequence movement of said film and aperture cards, said electromechanical system being further adapted to interrupt movement of said film when the cutoff elements are to be actuated.

20. Structure as set forth in claim 19 and further comprising a supply tray for receiving aperture cards in stacked relationship, a feed mechanism for separately feeding individual cards from said stack to said aperture card moving means, and a mechanism for sensing the introduction of an individual card for movement toward said curved path before the film moving means is actuated.

References Cited

UNITED STATES PATENTS

| | | | |
|---|---|---|---|
| 3,164,510 | 1/1965 | Stoothoff et al. | 156—514 |
| 3,264,154 | 8/1966 | Kiehl | 156—108 |

WILLIAM J. VAN BALEN, Primary Examiner

U.S. Cl. X.R.

156—249, 344, 379, 514, 584